(12) United States Patent
Ren et al.

(10) Patent No.: US 12,445,846 B2
(45) Date of Patent: Oct. 14, 2025

(54) TRANSMISSION OF NETWORK ACCESS INFORMATION FOR WIRELESS DEVICE (71) Applicant: Hewlett Packard Enterprise Development LP, Spring, TX (US)

(72) Inventors: Zhijun Ren, Beijing (CN); Chunfeng Wang, Beijing (CN); Mohd Shahnawaz Siraj, San Jose, CA (US); Rajesh Kumar Ganapathy Achari, Maharashtra (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 297 days.

(21) Appl. No.: 17/822,188

(22) Filed: Aug. 25, 2022

(65) Prior Publication Data

US 2024/0073690 A1 Feb. 29, 2024

(51) Int. Cl.
*H04W 12/08* (2021.01)
*H04W 12/06* (2021.01)
*H04W 84/12* (2009.01)

(52) U.S. Cl.
CPC .......... *H04W 12/08* (2013.01); *H04W 12/06* (2013.01); *H04W 84/12* (2013.01)

(58) Field of Classification Search
CPC ..................... H04W 4/50–80; H04W 8/18–245
See application file for complete search history.

(56) References Cited

U.S. PATENT DOCUMENTS

| 9,397,989 B1* | 7/2016 | Ramalingam ........... H04L 63/08 |
| 10,621,352 B2 | 4/2020 | Nix |
| 2010/0049980 A1* | 2/2010 | Barriga .................... H04L 9/083 370/352 |
| 2013/0117820 A1* | 5/2013 | Cherian .................. H04L 63/08 726/4 |
| 2018/0077255 A1 | 3/2018 | Goto |
| 2018/0109418 A1 | 4/2018 | Cammarota et al. |

(Continued)

OTHER PUBLICATIONS

Wi Fi Alliance, "Wi-Fi Easy Connect™ Specification", Version 2.0, 2020, 184 pages.

(Continued)

*Primary Examiner* — San Htun
(74) *Attorney, Agent, or Firm* — Dickinson Wright (57) ABSTRACT

Embodiments of the present disclosure relate to transmission of network access information for wireless devices. A method comprises transmitting an authorization request for the wireless device to a server upon receiving a presence announcement message from a wireless device. The method further comprises receiving an authorization response from the server including network access information and bootstrapping information of the wireless device. The method further comprise performing authentication with the wireless device based on the bootstrapping information. The method also comprises transmitting the network access information to the wireless device. The network access information includes a service set identifier (SSID) for a wireless local area network (WLAN) and credential information for the mobile device to access the WLAN. By automatically distributing network access information to the wireless device without requiring any user input, the efficiency of device provisioning and the security of WLAN can be improved.

20 Claims, 8 Drawing Sheets (56) References Cited

U.S. PATENT DOCUMENTS

2019/0036896 A1* 1/2019 Khushu .................. H04L 63/08
2020/0120502 A1* 4/2020 Lear .................... H04W 12/084
2022/0038457 A1* 2/2022 Reimer ............... H04L 12/4641

OTHER PUBLICATIONS

Wi-Fi Easy Connect—Specification—Version 2, 2020, Retrieved Aug. 25, 2022, 226 Pgs.
RadSec, Radius server support for MPSK not bound to MAC address, Mar. 3, 2022, 11 pages.

* cited by examiner

TRANSMISSION OF NETWORK ACCESS INFORMATION FOR WIRELESS DEVICE

BACKGROUND

Multiple pre-shared key (MPSK) provides the ability to allow different wireless devices, such as wireless stations or Internet of Things (IoT) devices, to access wireless local area networks (WLAN). For example, MPSK allows devices to access a Wi-Fi network by different pre-shared keys (PSKs) or simultaneous authentication of equals (SAE) passphrases, and can achieve better security. Usually, an administrator needs to distribute these PSK or SAE passphrases out of band to owners of wireless devices, for example, by email, instant message or other ways. Generally, the passphrases are exposed to the administrator and owners in plain text.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, where.

DETAILED DESCRIPTION

As described above, the MPSK is designed to provide better security for network access. Wireless devices do not share the same PSK or SAE passphrase to access the same PSK/SAE network. However, PSK or SAE passphrase distribution becomes a challenging job for administrators, especially in scale deployment. The PSK or SAE passphrase may be generated when the administrator registers wireless devices in a registry server. The administrator needs to record it during registration and send it to the owner of the wireless device over email, instant message or other ways. The owner then manually provisions the wireless devices with the passphrase. The passphrase however is vulnerable since it is exposed to the owner and has as a risk of being intercepted during the distribution. Furthermore, if the PSK or SAE passphrase has expired or is compromised, the administrator needs to generate a new one and distribute it again for each of the wireless devices. For a MPSK scenario where each device has its own passphrase, it is time consuming and requires high human cost.

Embodiments of the disclosure provide a zero-touch solution to distribute network access information to wireless devices in a MPSK-enabled network. According to embodiments of the present disclosure, a server in the network transmits device-specific trust data and network access information of the wireless devices to an access point (AP), and the AP can securely authenticate and configure the wireless devices with the network access information.

In embodiments of the present disclosure, the server firstly obtains device-specific bootstrapping information of multiple wireless devices as trust data. The bootstrapping information may be transmitted out of band to the server, for example, using QR code, Bluetooth low energy (BLE), or near field communication (NFC). The manner in which the bootstrapping information is transferred allows the server to gain a certain amount of trust that the bootstrapping information obtained belongs to the corresponding wireless device.

When a particular wireless device requests online provisioning, the server determines network access information for the wireless device to join the network, and transmits the network access information along with the bootstrapping information of the wireless device to the AP that acts as a configurator. The AP then authenticates the wireless device with the received bootstrapping information and configures the authenticated device with the network access information. Once successfully provisioned, the wireless device can establish secure associations with other devices in the network.

Details of one or more embodiments of the subject matter described in this disclosure are set forth in the accompanying drawings and the following description.

Figure 1:
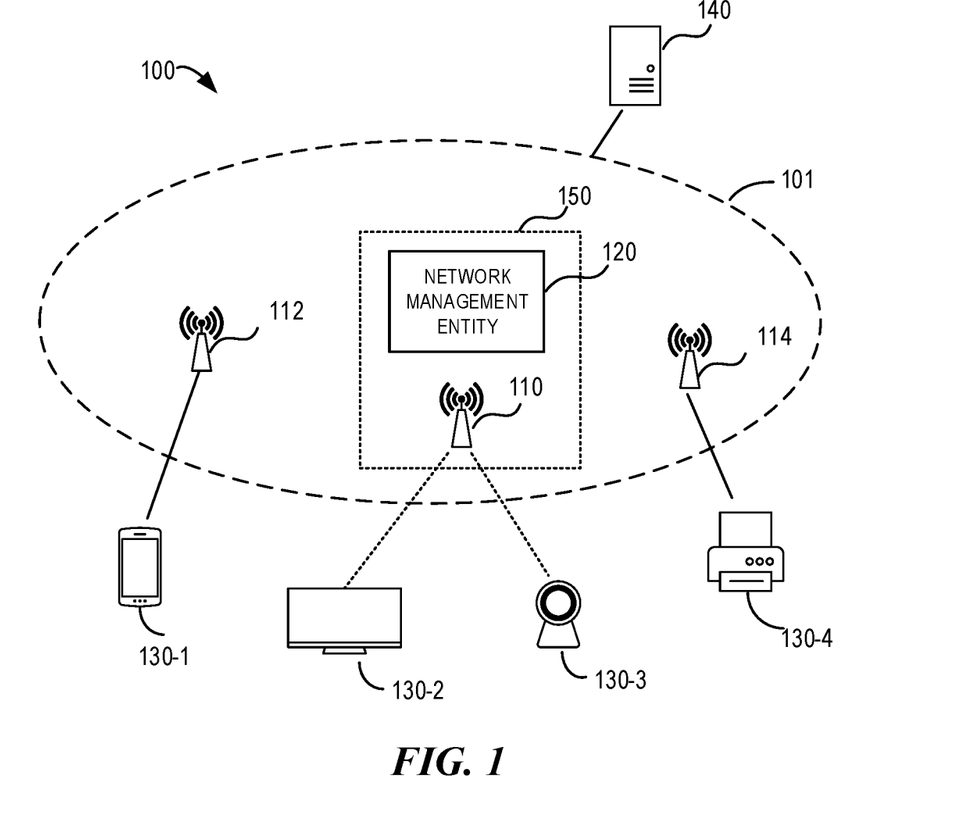
FIG. 1 illustrates a diagram of an example communication environment in which example embodiments of the present disclosure may be implemented.

FIG. 1 illustrates a diagram of an example communication environment in which example embodiments of the present disclosure may be implemented. The example environment 100 may be implemented to include one or more wireless communication networks, such as WLAN 101.

The example environment 100 includes a plurality of APs including AP 110, AP 112, and AP 114, and a plurality of wireless devices including wireless devices 130-1, 130-2, 130-3, and 130-4 (collectively referred to as "wireless devices 130" or individually referred to as a "wireless devices 130"). The example environment 100 further includes a network management entity 120 which is responsible for managing the WLAN 101. The network management entity 120 may be implemented anywhere in the network, for example, in the public cloud, the local network, or inside an AP. The example environment 100 further includes a server 140 responsible for authenticating and authorizing the wireless devices 130. The server 140 may be located in the public cloud or in the local network.

The wireless device 130 may also be a user device or station (STA). Examples of the wireless device 130 may include but not limited to a cell phone, a tablet device, a laptop computer, and an IoT device, such as smart TV, camera or the like. The AP 110, AP 112 and AP 114 may be any suitable device that allows one or more wireless devices 130 to connect to the WLAN 101 in the example environment 100.

As used herein, the AP 110, AP 112 and AP 114 may comprise, be implemented as, or known as a Radio Router, Radio Transceiver, switch, Wi-Fi hotspot device, BSS, Extended Service Set (ESS), Radio Base Station (RBS), or some other terminology. The AP 110, AP 112 and AP 114 may provide one or more WLANs for the wireless devices 130 to access and communicate with other components in the network. The WLAN may be identified with a service set identifier (SSID). In some embodiments, a single AP may provide multiple WLANs with different SSIDs, while a WLAN may be provided by multiple APs.

In general, the wireless device 130 needs to be provisioned with network access information to access a WLAN. The network access information may include an SSID and credential information for that WLAN. As shown in FIG. 1, the wireless devices 130-1 and 130-4 have been successfully provisioned and connected to the AP 112 and the AP 114 respectively, while the wireless devices 130-2 and 130-3 need to be provisioned by the AP 110 and the network management entity 120 (hereafter collectively referenced as "network management entity and AP 150) to join the WLAN 101. It is to be understood that the network management entity 120 may be implemented separately from the AP 110 or as a part of the AP 110.

Depending on authentication and encryption methods of the WLAN, the credential information may include Authentication and Key Management (AKM) and corresponding credentials. The AKM indicates an authentication type for the network. For example, the AKM may be a string of "psk" indicating that the network requires a PSK-based WPA2 authentication, and the corresponding credential should include a PSK passphrase. As another example, the AKM may be a string of "sae" indicating that the network requires a SAE-based WPA3 authentication, and the corresponding credential should include a SAE passphrase. Alternatively, the AKM may be a string of "dpp" indicating that the network requires DPP-based authentication, and the corresponding credential should include a signed connector, C-sign-key. According to Device Provisioning Protocol (DPP), the connector is provisioned on the wireless device 130 and used to establish a secure association with an AP of the network, and the C-sign-key is the public key of a configurator (such as an AP) to verify the connector. Both the connector and the C-sign-key may be included in a data structure named DPP configuration object and transmitted to the wireless device 130. In some embodiments, the PSK passphrase and the SAE passphrase may also be included in the DPP configuration object for legacy authentication.

The network management entity and AP 150 may provision a DPP-enabled wireless device 130 with a DPP connector. For a legacy device, for example, a WPA2 PSK or WPA3 SAE device, the network management entity and AP 150 may provision the device with network access information including an SSID, AKM, a passphrase, and optionally an expiry time. To provision the wireless devices, the network management entity and AP 150 firstly obtains device-specific bootstrapping information and network access information from the server 140, and provisions the wireless devices 130 with the bootstrapping information and network access information, for example, using DPP the authentication request/response and the configuration request/response. In some implementations, the AP 110 may communicate with the server 140 directly. In other implementations, the AP may work with the network management entity 120 to communicate with the server 140.

The server 140 manages the wireless devices 130 based on policies of the administrator. The server 140 may maintain trust data of wireless devices 130, for example, bootstrapping information. According to DPP, a wireless device 130 uses a distinct pair of keys for each bootstrapping method it supports. The bootstrapping information may include public bootstrapping key for the wireless device 130 that may be used in authenticating and provisioning. In some embodiments, the bootstrapping information may be obtained out-of-band from the wireless devices 130. Note that the manner in which the bootstrapping information is obtained shall allow the server 140 to gain a certain amount of trust that the bootstrapping information belongs to the wireless device 130.

The bootstrapping information may further include a list of channels and the wireless device 130's MAC address. By bootstrapping information, the wireless device indicates that it shall listen on one of the listed channels for other devices to initiate the DPP authentication process. The MAC address may be used by the DPP authentication initiator, for example, the AP 110, to transmit an authentication request by unicast.

The server 140 may obtain the bootstrapping information by way of QR code, BLE, NFC, and knowledge of a third party. For example, when the server 140 is in proximity to the wireless device 130, the server may use a camera to scan a QR code displayed on the device, or establish a NFC or BLE connection to obtain the bootstrapping information. Alternatively, the server 140 may acquire the bootstrapping information from a third party, for example a manufacturer of the device.

For MPSK where the wireless devices 130 have different credentials, the server 140 may further generate and maintain network access information for a specific wireless device 130. The network access information may include an SSID. The SSID is a part of configuration to tell the wireless device which WLAN it connects to. The network access information may further include an authentication type which indicates authentication method for the device. The SS ID and the authentication type may be determined based on the policy at the server 140. The network access information may further include a PSK or SAE passphrase used for establishing a secure connection to an AP that provide a WLAN with the SSID. The passphrase may be automatically generated during provisioning, for example, when the wireless device is authorized by the server 140. In some embodiments, the network access information may further include an expiry time for the passphrase.

Once provisioned, the wireless device 130 may attempt to access the WLAN 101 with the SSID. The AP 110 may transmit credentials received from the wireless device 130 to the server 140 for authentication and receive an authentication result from the server 140. Alternatively, the AP 110 may retrieve network access information from the server 140 to verify the wireless device 130 by itself. If the wireless device 130 is verified, the AP 110 allows the wireless device 130 to access the WLAN 101; otherwise, the AP 110 rejects the wireless device 130 to access the WLAN 101.

It is to be understood that the numbers of APs, wireless devices, network management entity and server in FIG. 1 are only for the purpose of illustration without suggesting any limitations. The example environment 100 may include any suitable number of APs, wireless devices, network management entity and server configured for implementing embodiments of the present disclosure.

Communications in the example environment 100 may operate according to the wireless communication protocols such as Institute of Electrical and Electronic Engineers (IEEE) 802.11 standards, Wi-Fi Alliance Specifications, or any other wireless communication standards. The IEEE 802.11 standards may include the IEEE 802.11ax standard, or any other wireless communication standards.

By use of the network management entity and AP 150 and the server 140, the wireless devices 130 can be provisioned automatically and without requiring any user input, to implement MPSK and achieve better security. Some example embodiments of the present disclosure will be discussed in detail below with reference to other figures.

Figure 2:
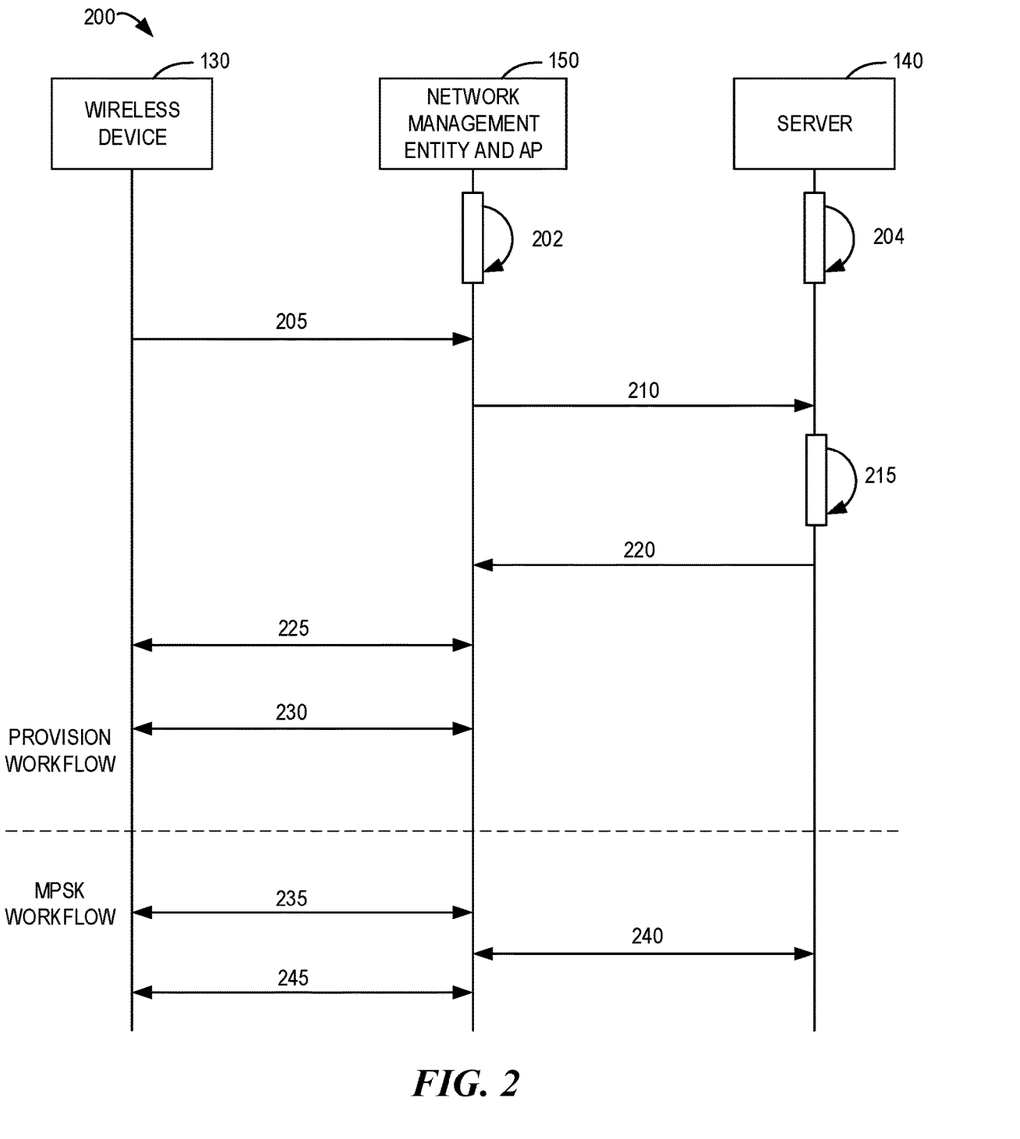
FIG. 2 illustrates a signaling flow for provisioning a wireless device in accordance with some example embodiments of the present disclosure.

FIG. 2 illustrates a signaling flow 200 for provisioning a wireless device in accordance with some example embodiments of the present disclosure. For the purpose of discussion, the signaling flow 200 will be described with reference to FIG. 1.

At 202, the network management entity and AP 150 may provide the configuration interface for an administrator to bring up WPA2 SPK or WPA3 SAE SSID on AP to serve wireless device 130 and specify the server 140 for MPSK.

At 204, the server 140 obtains bootstrapping information of multiple wireless devices 130. As mentioned above, the bootstrapping information may include a public bootstrapping key, a MAC address, and a list of channels for each of the wireless devices.

In some embodiments, the server 140 may obtain the bootstrapping information by scanning, if it has or connects to a camera, a two dimensional QR code displayed on the wireless devices 130. The server 140 may establish, if it is in proximity to the wireless devices 130, NFC or BLE connections with the wireless devices 130 to obtain the bootstrapping information stored in the wireless devices. In addition, the server 140 may obtain the bootstrapping information by knowledge of a third party, such as the manufacturer of the devices.

At 205, a wireless device 130 to be provisioned sends a presence announcement message on a set of channels. For each channel, the wireless device 130 sends the presence announcement message and listens for a period of time (such as 2 seconds or more) on the channels in the bootstrapping information for an authentication request.

The presence announcement message may contain a hash that includes a public bootstrapping key of the wireless device 130. To prevent leakage of the hash of an unprovisioned device's public bootstrapping key, the hash for the presence announcement message may be a hash of a pre-shared string (for example, "chirp") concatenated with the public bootstrapping key.

After receiving the presence announcement message, the network management entity and AP 150 transmits at 210 an authorization request to the server 140. The authorization request also includes the hash for the presence announcement message.

After receiving the authorization request, the server 140 determines at 215 network access information for the wireless device 130. In some embodiments, the server 140 may validates the authorization request before determining the network information. As mentioned above, the server 140 has obtained the bootstrapping information of multiple wireless devices. The server 140 may compare the hash in the authorization request with computed from the bootstrapping information to determine whether to authorize the wireless device 130 for provisioning. The server 140 may validate the authorization request by other ways, for example, based on hardware or software information and settings of the wireless device 130, owner of the device, and the like.

In some embodiments, the server 140 may determine the network access information based on a predefined provisioning policy. The network information may include an SSID and credential information. The credential information may include an authentication type. The provisioning policy may relate to hardware and software information of the wireless device as well as availability and loads of the WLANs. The SSID and authentication type for the wireless device 130 may be determined based on the network address, operating system, hardware information of the wireless device 130. For example, the server 140 may determine the SSID according to the address range that the IP address of the device falls in. The server 140 may further determine the authentication type that both the device and potential AP support.

In addition to the authentication type, the credential information may include a passphrase, for example, a WPA2 PSK passphrase or a WPA3 SAE passphrase. The passphrase may be automatically generated when the authorization request is received and validated. The passphrase may be a string having for example 8 to 63 characters. For MPSK, the server 140 generates different passphrases for wireless devices in the network.

In some embodiments, the server 140 may specify an expiry time for the passphrase as a part of credential information. The server 140 may update the passphrase periodically such that the wireless device is unable to access the WLAN 101 with a passphrase that has expired. In some cases, if the passphrase is compromised, the passphrase could be revoked in the server 140, after that the wireless device 130 will fail to access the network with the revoked passphrase.

At 220, the server 140 transmits the determined network access information together with the bootstrapping information for the device to the network management entity and AP 150.

Afterwards, the network management entity and AP 150 provisions the wireless device 130. During provisioning, the network management entity and AP 150 acts as a configurator and the wireless device 130 acts as an enrollee.

At 225, the network management entity and AP 150 performs DPP authentication with the wireless device 130 based on the bootstrapping information. After authentication, the network management entity and AP 150 further performs DPP configuration 230 with the wireless device 130. During the DPP configuration 230, the wireless device 130 receives the network access information from the network management entity and AP 150. Example of the DPP authentication 225 and the DPP configuration 230 will be described with reference to FIG. 3 below.

The wireless device 130 reads the values in the network access information and applies them to its configuration accordingly. Then, the wireless device 130 performs 802.11 authentication and association 235 with the AP 110 that provides the WLAN with the SSID in the network access information.

The authentication and association 235 may sequentially include an authentication request by the wireless device 130, an authentication response by the network management entity and AP 150, an association request by the wireless device 130, and an association response by the network management entity and AP 150. To authenticate the wireless device 130, at 240, the AP may transmit credentials received from the wireless device 130 to the server 140 for authentication and receive the authentication result from the server 140. Once authenticated, at 245, the wireless device 130 performs the 4-way handshake with the AP 110 to establish a secure connection between the device 130 and the AP 110.

By acquiring network access information that is specific to each wireless device and securely provisioning it to the wireless device 130, the network management entity and AP 150 can more efficiently provision multiple wireless devices with different credentials, such as passphrases. Since the provisioning process performed in band and without requiring any user input, the credentials are not exposed and thus better security can be achieved. In addition, the credentials are distributed to the wireless devices efficiently, and therefore the server can manage the credentials easily to improve the security. For example, the server can renew the credentials more frequently or revoke the credential if they are compromised.

Several example embodiments have been discussed above with respect to FIGS. 1-2. An additional example implementation regarding a DPP authentication and DPP configuration between the wireless device 130 and network management entity and AP 150 will be described with respect to FIG. 3 below. An additional example implementation regarding renewal of credentials will be described with respect to FIG. 4 below.

Figure 3:
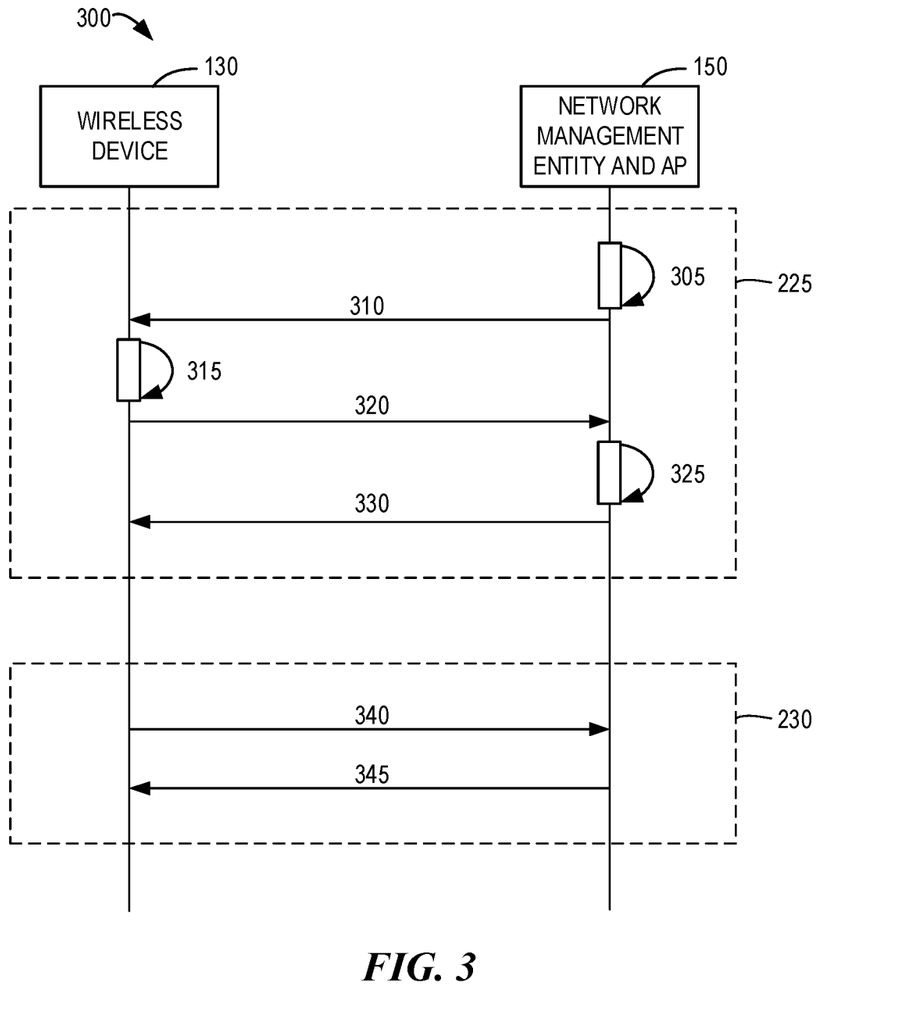
FIG. 3 illustrates a signaling flow of authentication and configuration in accordance with some example embodiments of the present disclosure.

FIG. 3 illustrates a signaling flow 300 of authentication and configuration in accordance with some example embodiments of the present disclosure. The signal flow 300 is an example implementation of the authentication 225 and configuration 230.

In FIG. 3, the signal flow 300 is between a pair of devices: the wireless device 130 which acts as an enrollee device and the network management entity and AP 150 which acts as a configurator device. The signal flow 300 generally includes two phases including the authentication 225 and the configuration 230. The authentication 225 relies on the bootstrapping information received from the server 140 as described with reference to FIG. 2. The bootstrapping information includes the public bootstrapping key, a channel list and the MAC address of the wireless device 130.

During the authentication 225, the bootstrapping information is used to strongly authenticate the wireless device 130. The authentication 225 involves a 3-message exchange and generates a shared secret and authenticated key. At 305, the network management entity and AP 150 generates a first nonce, generates a protocol key pair, performs a hash function of the public bootstrap key of the wireless device 130, and generates a first symmetric key based on a shared secret derived from the hashed bootstrapping key. At 310, the network management entity and AP 150 sends an authentication request message via one or more of the channels in the channel list of the bootstrapping information. The authentication request message includes the shared secret and the first nonce encrypted by the first symmetric key.

At 315, the wireless device 130 receives the authentication request message and checks whether a hash of its public bootstrapping key is in the message. If a hash of its public bootstrapping key is in the message, the wireless device 130 generates the shared secret and derives the first symmetric key. The wireless device 130 attempts to unwrap the first nonce using the first symmetric key. Next, the wireless device 130 generates a second nonce, a shared secret, and a second symmetric key. The wireless device 130 wraps the two nonces and its capabilities in the first symmetric key and wraps the authenticating tag in the second symmetric key. The wireless device 130 then places a hash of its public bootstrapping key (and optionally a hash of the public bootstrapping key of the network management entity and AP 150 for mutual authentication), its public protocol key, the wrapped nonces along with its wrapped network public key and the wrapped authentication tag in an authentication response message. At 320, the wireless device 130 transmits the authentication response message to the network management entity and AP 150.

After receiving a response, the network management entity and AP 150 may validate at 325 the result and transmit at 330 an authentication confirmation message to complete the authentication 225. After successful completion of the authentication, a secure channel between the network management entity and AP 150 and the wireless device 130 is established.

After the authentication is completed, during the configuration 230, the network management entity and AP 150 configures the wireless device 130 for device-to-device communication or infrastructure communication. The wireless device 130 initiates the configuration 230 by transmitting at 340 a configuration request message. At 345, the wireless device 130 receives a configuration response message. The configuration response message includes network access information specific to the wireless device 130 consisting of an SS ID, authentication type (e.g. AKM), passphrase and an expiry time. After receiving the configuration response message, the wireless device 130 applies the network access information and thus is provisioned to establish secure access to the WLAN specified by the SSID.

Figure 4:
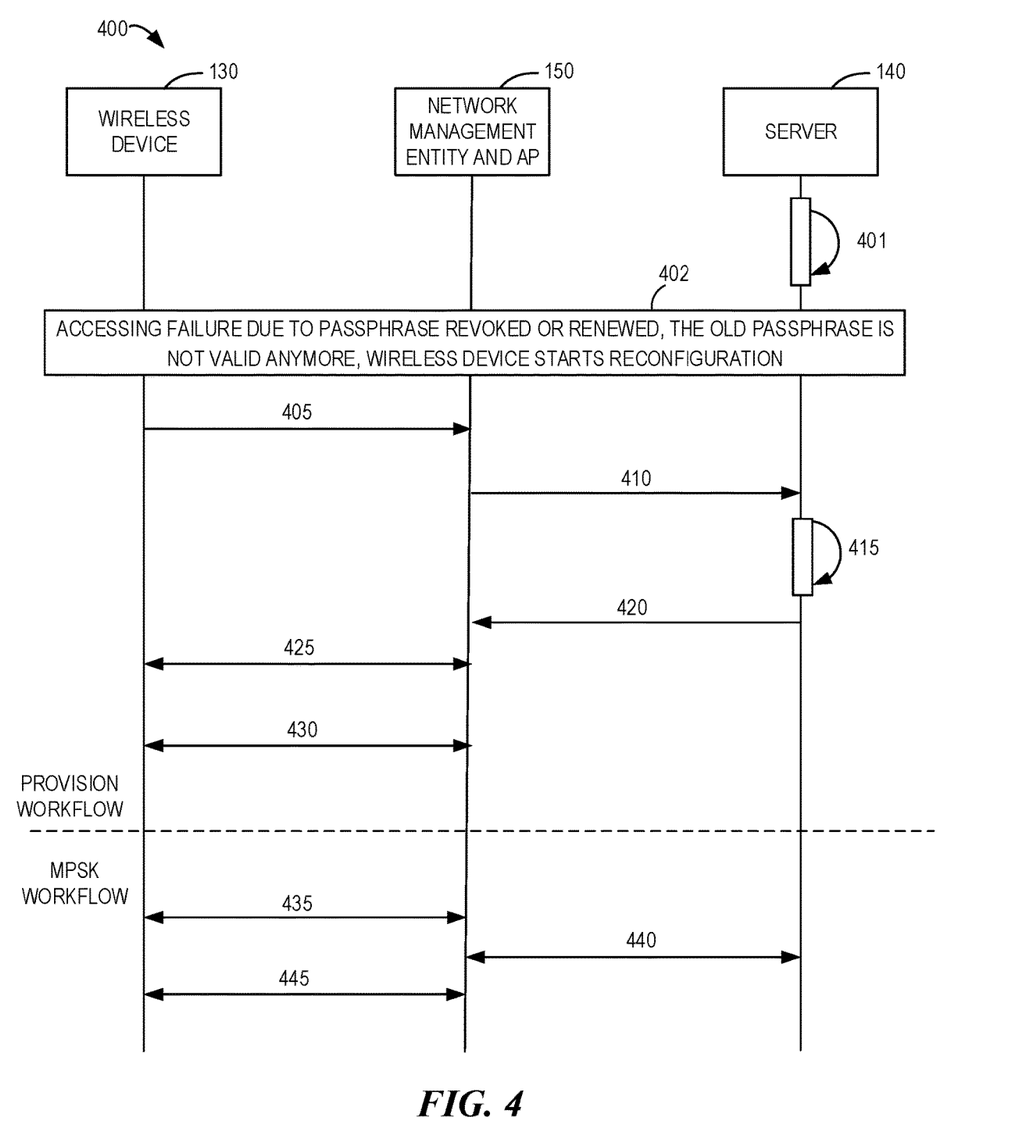
FIG. 4 illustrates a signaling flow for reconfiguring a wireless device in accordance with some example embodiments of the present disclosure.

FIG. 4 illustrates a signaling flow 400 for reconfiguring a wireless device in accordance with some example embodiments of the present disclosure. At 401, when the credential such as the passphrase has expired or is compromised, the server 140 renews or revokes the credential for the wireless device. As a result, at 402, the old credential is unusable anymore. In this case, the wireless device 130 may transmits another presence announcement message as described in FIG. 2 to refresh the network access information. For example, if the wireless device 130 is notified that the old credential has been revoked by the server 140, it may initiate the provisioning procedure from scratch by transmitting a presence announcement message to the network management entity and AP 150. In some cases, if it is notified that the old has expired, the wireless device 130 may transmit a reconfiguration announcement message instead of the presence announcement message. The reconfiguration announcement message may require less authentication and authorization operations than the presence announcement message does. Alternatively, if the credential is about to expire (the expiry time has been transmitted to the device), the wireless device 130 may automatically start reconfiguration to renew the passphrase.

At 405, the wireless device 130 transmits a reconfiguration announcement message to the network management entity and AP 150. The reconfiguration announcement message indicates that the wireless device 130 requests a renewed passphrase from the server 140. The reconfiguration announcement message may also include the hash of the public bootstrapping key for the authorization at the server 140.

At 410, the network management entity and AP 150 transmits a passphrase request to the server 140. At 415, the server 140 validates passphrase request and determines whether to authorize the wireless device 130. If so, the server 140 generates or retrieves a renewed passphrase, and transmits at 420 the renewed passphrase to the network management entity and AP 150.

In some embodiments, the server 140 may transmit the complete renewed network access information, including an SSID, an authentication type and the passphrase, and so forth.

Afterwards, the network management entity and AP 150 performs reconfiguration authentication 425 and reconfiguration 430 with the wireless device 130. The reconfiguration authentication 425 is similar to those as described in FIGS.

2 and 3. After authentication, at 430, the network management entity and AP 150 transmits the renewed passphrase to the wireless device 130.

The wireless device 130 receives and applies the renewed passphrase. The wireless device 130 then performs again the 802.11 authentication and association 435 with the AP 110. To authenticate the wireless device 130, the network management entity and AP 150 may again transmit credentials to the server 140 for authentication and receive the authentication result from the server 140. Once authenticated, the wireless device 130 performs the 4-way handshake 445 with the AP 110 to establish another secure connection between the device 130 and the AP 110.

By use of the expiry time, the credential lifetime management can be automatically and efficiently controlled, and the wireless devices can update their credentials in a period following the pre-defined policy by the administrator.

Figure 5:
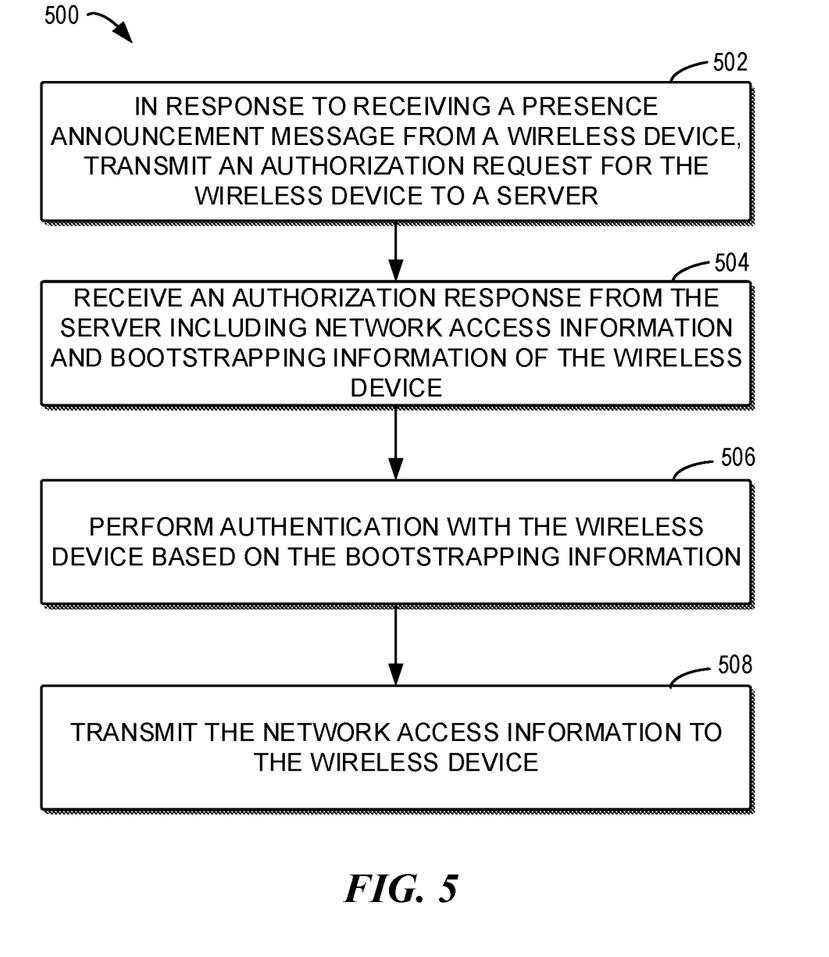
FIG. 5 illustrates a flowchart of a method in accordance with some example embodiments of the present disclosure.

FIG. 5 illustrates a flowchart of a method 500 in accordance with some example embodiments of the present disclosure. The method 500 may be performed by the network management entity and AP 150 according to the embodiments described herein. While only some blocks are shown in the method 500, the method 500 may comprise other operations in addition to those as described herein.

At 502, in response to receiving a presence announcement message from a wireless device, the network management entity and AP 150 transmits an authorization request for the wireless device 130 to a server 140.

At 504, the network management entity and AP 150 receives an authorization response from the server 140. The authorization response includes network access information and bootstrapping information of the wireless device 130.

At 506, the network management entity and AP 150 performs authentication with the wireless device 130 based on the bootstrapping information.

At 508, the network management entity and AP 150 transmits the network access information to the wireless device 130. The network access information includes a service set identifier (SSID) for a wireless local area network (WLAN) and credential information for the mobile device to access the WLAN.

In some embodiments, the presence announcement message may comprise a hash including a public bootstrapping key for the wireless device. For example, the hash may be a hash of a predefined string concatenated with the public bootstrapping key. When transmitting the authorization request, the network management entity and AP 150 may transmit the hash including the public bootstrapping key to the server 140.

In some embodiments, the credential information may include an authentication type and a passphrase for the WLAN.

In some embodiments, the credential information may further include an expiry time for the passphrase. In the method 500, the network management entity and AP 150 may further receive a reconfiguration announcement message from the wireless device 130 for renewal of the passphrase. The reconfiguration announcement message may be initiated when the wireless device 130 determines that the passphrase is about to expire, or when it determines or is notified that the old passphrase is invalid. The network management entity and AP 150 transmits a passphrase request for the mobile device 130 to the server 140, and accordingly may receive a renewed passphrase from the server 140. Afterwards, the network management entity and AP 150 transmits the renewed passphrase to the wireless device 130. As such, the wireless device 130 is provisioned with the renewed passphrase.

In some embodiments, the bootstrapping information may include a public bootstrapping key for the wireless device 130 and a channel on which the wireless device listens for the authentication. In performing authentication with the wireless device 130, the network management entity and AP 150 may transmits over the channel a authentication request including a hash of the public bootstrapping key of the wireless device 130, receives an authentication response from the wireless device 130, and transmits an authentication confirmation message to the wireless device 130.

After receiving the authentication confirmation message, the wireless device 130 transmits a configuration request over the channel that is used during authentication to the network management entity and AP 150. In response to receiving a configuration request from the wireless device 130, the network management entity and AP 150 may transmit a configuration response including the network access information to the wireless device 130.

Figure 6:
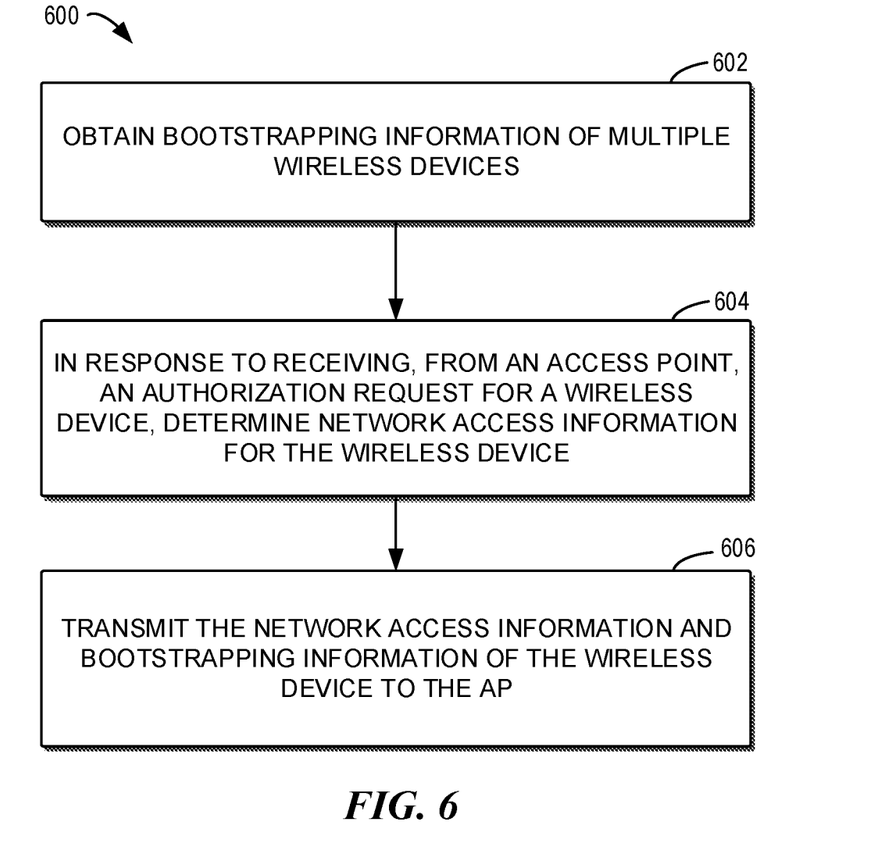
FIG. 6 illustrates a flowchart of another method in accordance with some example embodiments of the present disclosure.

FIG. 6 illustrates a flowchart of a method 600 in accordance with some example embodiments of the present disclosure. The method 600 may be performed by the server 140 according to the embodiments described herein. While only some blocks are shown in the method 600, the method 600 may comprise other operations in addition to those as described herein.

At 602, the server 140 obtains bootstrapping information of multiple wireless devices 130.

At 604, in response to receiving, from an AP 110, an authorization request for a wireless device 130, the server 140 determines network access information for the wireless device 130.

At 606, the server 140 further transmits the network access information and bootstrapping information of the wireless device 130 to the AP 110. The network access information includes a service set identifier (SSID) for a wireless local area network (WLAN) and credential information for the mobile device 130 to establish a connection to access the WLAN.

In some embodiments, the server 140 may obtain the bootstrapping information by use of scanning QR codes, NFC communication, Bluetooth communication, and knowledge of a third party.

In some embodiments, the bootstrapping information of multiple wireless devices 130 includes public bootstrapping keys of the multiple wireless devices 130, The authorization request may include a hash including a public bootstrapping key of the wireless device 130. The server 140 may validate the authorization request based on the hash in the authorization request and the public bootstrapping keys of the multiple wireless devices 130.

In some embodiments, the server 140 may determine the network access information based on at least one of a network address of the wireless device 130, an operating system of the wireless device 130, and hardware information of the wireless device 130.

In some embodiments, the credential information may include an authentication type and a passphrase for the WLAN. The credential information may further include an expiry time for the passphrase.

In some embodiments, in accordance with a determination that the passphrase is compromised or has expired, the server 140 may revoke the passphrase.

In some embodiments, in response to receiving a passphrase request for the mobile device from the AP 110, the server 140 may determine a renewed passphrase for the wireless device and transmit the renewed passphrase to the AP 110.

Figure 7:
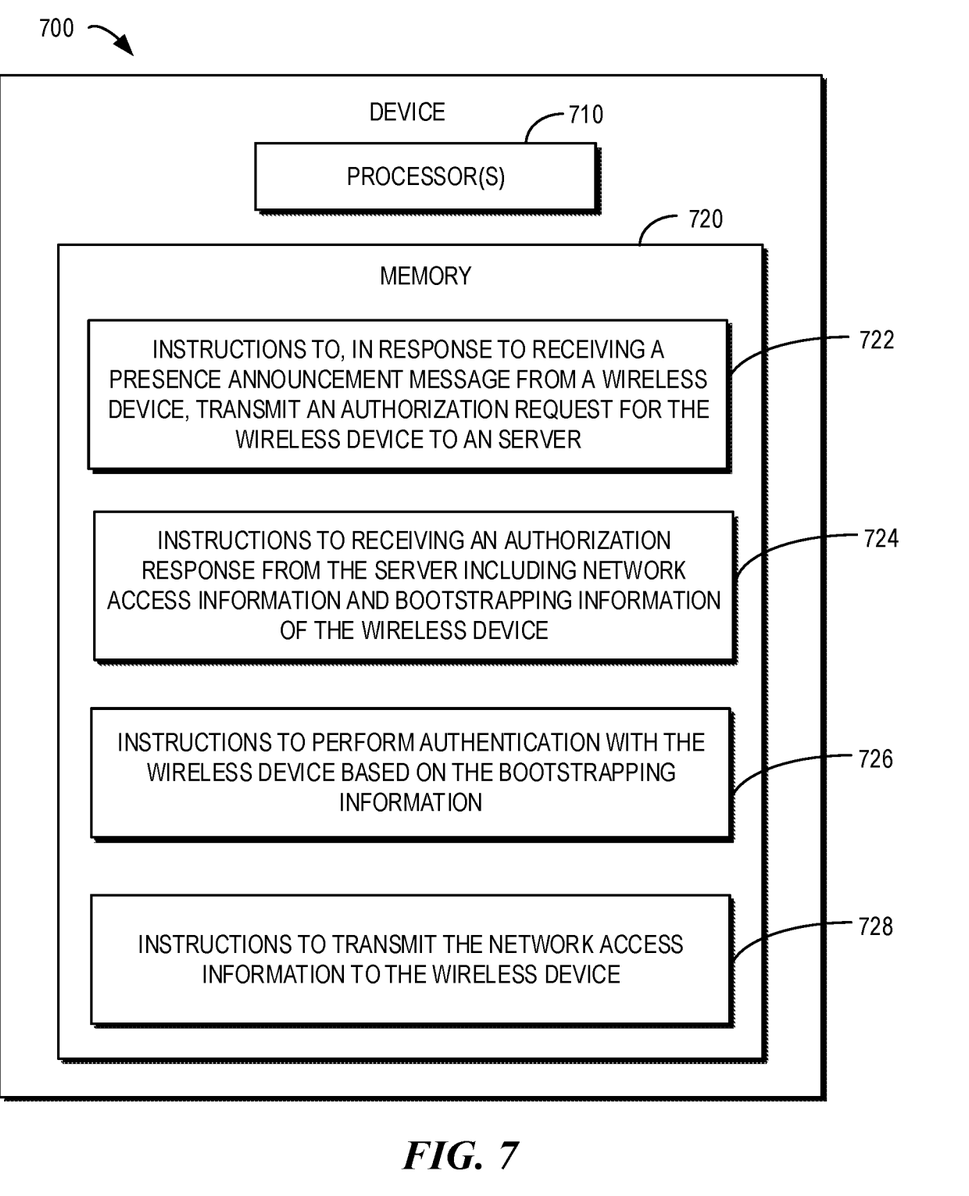
FIG. 7 illustrates a block diagram of an example device in accordance with some example embodiments of the present disclosure.

FIG. 7 illustrates a block diagram of an example device 700 in accordance with some example embodiments of the present disclosure. The device 700 comprises at least one processor 710 and a memory 720 coupled to the at least one processor 710. The memory 720 stores instructions to cause the at least one processor 710 to implement actions of the method according to embodiments of the present disclosure.

The example device 700 may be used to implement any of the network elements in the disclosure, including but not limited to the AP 110, the network management entity 120, or both.

As illustrated in FIG. 7, the memory 720 stores instructions 722 to, in response to receiving a presence announcement message from a wireless device, transmit an authorization request for the wireless device to a server.

In some embodiments, the presence announcement message may comprise a hash including a public bootstrapping key for the wireless device, and the instructions 722 to transmit an authorization request for the wireless device to a server may comprise instructions to transmit the hash including the public bootstrapping key to the server.

The memory 720 further stores instructions 724 to receive an authorization response from the server including network access information and bootstrapping information of the wireless device.

The memory 720 further stores instructions 726 to perform authentication with the wireless device based on the bootstrapping information.

In some embodiments, the bootstrapping information may include a public bootstrapping key for the wireless device and a channel on which the wireless device listens for the authentication. The instructions 726 may further comprise instructions to transmit, over the channel, an authentication request including a hash of the public bootstrapping key of the wireless device, instructions to receive an authentication response from the wireless device, and instructions to transmit an authentication confirmation message to the wireless device.

The memory 720 further stores instructions 728 to transmit the network access information to the wireless device. The network access information includes a service set identifier (SSID) for a wireless local area network (WLAN) and credential information for the wireless device to access the WLAN.

In some embodiments, the instructions 728 to transmit the network access information to the wireless device may comprise instructions to, in response to receiving a configuration request from the wireless device, transmit a configuration response including the network access information to the wireless device.

In some embodiments, the credential information may include an authentication type and a passphrase for the WLAN. The credential information may further include an expiry time for the passphrase.

In some embodiments, the memory 720 may further store instructions to receive a reconfiguration announcement message from the wireless device for renewal of the passphrase, instructions to transmit a passphrase request for the wireless device to the server, instructions to receive a renewed passphrase from the server, and instructions to transmit the renewed passphrase to the wireless device.

Figure 8:
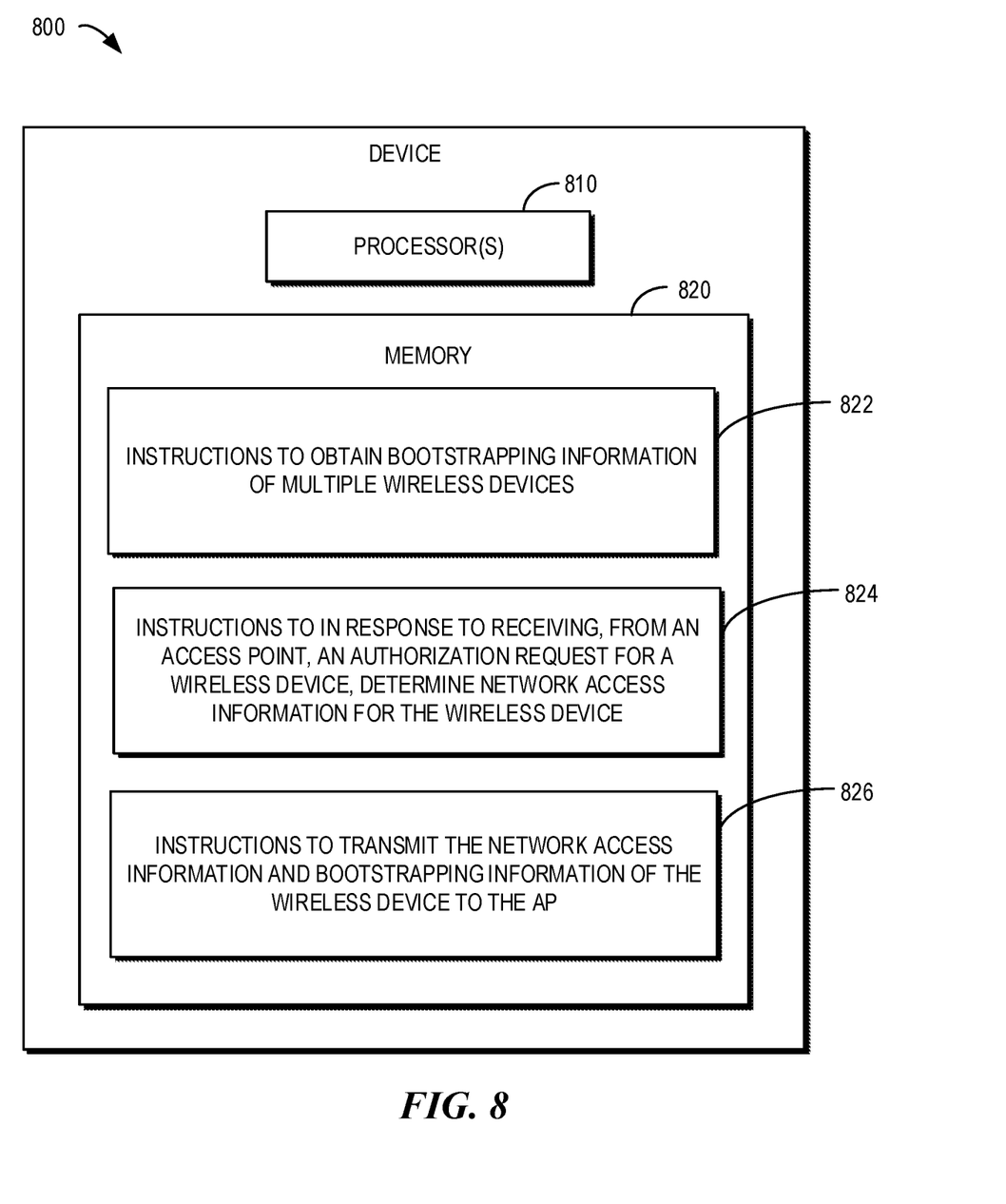
FIG. 8 illustrates a block diagram of another example device in accordance with some example embodiments of the present disclosure.

FIG. 8 illustrates a block diagram of an example device 800 in accordance with some example embodiments of the present disclosure. The device 800 comprises at least one processor 810 and a memory 820 coupled to the at least one processor 810. The memory 820 stores instructions to cause the at least one processor 810 to implement actions of the method according to embodiments of the present disclosure.

The example device 800 may be used to implement any of the network elements in the disclosure, including but not limited to the server 140.

As illustrated in FIG. 8, the memory 820 stores instructions 822 to obtain bootstrapping information of multiple wireless devices.

In some embodiments, the instructions 822 to obtain bootstrapping information of multiple wireless devices may comprise instructions to obtain the bootstrapping information by use of scanning QR codes, NFC communication, Bluetooth communication, or knowledge of a third party.

The memory 820 further stores instructions 824 to, in response to receiving from an access point (AP) an authorization request for a wireless device, determine network access information for the wireless device. The network access information includes a service set identifier (SSID) for a wireless local area network (WLAN) and credential information for the wireless device to establish a connection to access the WLAN.

The memory 820 further stores instructions 826 to transmit the network access information and bootstrapping information of the wireless device to the AP.

In some embodiments, the bootstrapping information of multiple wireless devices may include public bootstrapping keys of the multiple wireless devices, and the authorization request may include a hash including a public bootstrapping key of the wireless device. The memory 820 may stores instructions to validate the authorization request based on the hash in the authorization request and the public bootstrapping keys of the multiple wireless devices.

In some embodiments, the instructions 824 to determine the network access information for the wireless device may comprise instructions to determine the network access information based on at least one of a network address of the wireless device, an operating system of the wireless device, and hardware information of the wireless device.

In some embodiments, the credential information may include an authentication type and a passphrase for the WLAN. The credential information may further include an expiry time for the passphrase.

The memory 820 may further store instructions to, in accordance with a determination that the passphrase is compromised or has expired, revoke the passphrase.

The memory 820 may further store instructions to, in response to receiving a passphrase request for the wireless device from the AP, determine a renewed passphrase for the wireless device, and transmit the renewed passphrase to the AP.

The present disclosure also provides at least one computer program product tangibly stored on a non-transitory computer-readable storage medium. The computer program product includes program codes or instructions which can be executed to carry out the method as described above with reference to FIGS. 5 and 6.

While the above discussion used a Wi-Fi communication standard as an illustrative example, in other embodiments a wide variety of communication standards and, more generally, wireless communication technologies may be used. Furthermore, while some of the operations in the foregoing embodiments were implemented in hardware or software, in general the operations in the preceding embodiments can be implemented in a wide variety of configurations and architectures. Therefore, some or all of the operations in the foregoing embodiments may be performed in hardware, in software or both.

It should be noted that specific terms disclosed in the present disclosure are proposed for convenience of description and better understanding of example embodiments of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method, comprising:
   in response to receiving a presence announcement message from a wireless device, transmitting an authorization request for the wireless device to a server, the presence announcement comprising a hash including a public bootstrapping key for the wireless device;
   receiving an authorization response from the server including network access information and bootstrapping information of the wireless device;
   performing authentication with the wireless device based on the bootstrapping information; and
   transmitting the network access information to the wireless device,
   wherein the network access information includes a service set identifier (SSID) for a wireless local area network (WLAN) and credential information for the wireless device to access the WLAN, the credential information including an authentication type, a passphrase for the WLAN and an expiry time for the passphrase.

2. The method of claim 1, wherein transmitting the authorization request comprises:
   transmitting the hash including the public bootstrapping key to the server.

3. The method of claim 1, further comprising:
   receiving a reconfiguration announcement message from the wireless device for renewal of the passphrase;
   transmitting a passphrase request for the wireless device to the server; receiving a renewed passphrase from the server; and
   transmitting the renewed passphrase to the wireless device.

4. The method of claim 1, wherein the bootstrapping information includes a public bootstrapping key for the wireless device and a channel on which the wireless device listens for the authentication, and performing the authentication with the wireless device comprises:
   transmitting, over the channel, a authentication request including a hash of the public bootstrapping key of the wireless device;
   receiving an authentication response from the wireless device; and
   transmitting an authentication confirmation message to the wireless device.

5. The method of claim 1, wherein transmitting the network access information to the wireless device comprises:
   in response to receiving a configuration request from the wireless device, transmitting a configuration response including the network access information to the wireless device.

6. A device comprising:
   at least one processor; and
   a memory coupled to the at least one processor, the memory storing instructions to cause the at least one processor to implement acts comprising:
   in response to receiving a presence announcement message from a wireless device, transmitting an authorization request for the wireless device to a server, the presence announcement comprising a hash including a public bootstrapping key for the wireless device;
   receiving an authorization response from the server including network access information and bootstrapping information of the wireless device;
   performing authentication with the wireless device based on the bootstrapping information; and
   transmitting the network access information to the wireless device,
   wherein the network access information includes a service set identifier (SSID) for a wireless local area network (WLAN) and credential information for the wireless device to access the WLAN, the credential information including an authentication type, a passphrase for the WLAN and an expiry time for the passphrase.

7. The device of claim 6, wherein transmitting the authorization request comprises:
   transmitting the hash including the public bootstrapping key to the server.

8. The device of claim 6, the acts further comprising:
   receiving reconfiguration announcement message from the wireless device for renewal of the passphrase;
   transmitting a passphrase request for the mobile device to the server;
   receiving a renewed passphrase from the server; and
   transmitting the renewed passphrase to the wireless device.

9. The device of claim 6, wherein the bootstrapping information includes a public bootstrapping key for the wireless device and a channel on which the wireless device listens for the authentication, and performing authentication with the wireless device comprises:
   transmitting, over the channel, a authentication request including a hash of the public bootstrapping key of the wireless device;
   receiving an authentication response from the wireless device; and
   transmitting an authentication confirmation message to the wireless device.

10. A wireless device, comprising:
    at least one processor; and
    a memory coupled to the at least one processor, the memory storing instructions to cause the at least one processor to implement acts comprising:
       transmitting a presence announcement message to a network management entity and access point (AP), the presence announcement comprising a hash including a public bootstrapping key for the wireless device;
       receiving network access information and bootstrapping information from the network management entity and the AP, the network management entity and the AP having transmitted an authorization request for the wireless device to a server in response to receiving the presence announcement message, and having received an authorization response from the server including the network access information and the bootstrapping information for the wireless device;
       performing authentication operations with the network management entity and the AP based on the bootstrapping information; and
       accessing the network using the network access information upon being authenticated;
       wherein the network access information comprising a service set identifier (SSID), authentication type information, a passphrase, and an expiry time.

11. The wireless device of claim 10, wherein the instructions that cause the at least one processor to transmit the presence announcement message comprises further instructions that cause the at least one processor to transmit the presence announcement message over a set of channels specified in the bootstrapping information.

12. The wireless device of claim 10, wherein the memory stores further instructions to cause the at least one processor to read values in the network access information, and apply the values to the wireless device's network access configuration.

13. The wireless device of claim 10, wherein the memory stores further instructions to cause the at least one processor to initiate configuration of the wireless device by transmitting a configuration request message to the network management entity and the AP, wherein a configuration response message from the network management entity and the AP includes the network access information.

14. The wireless device of claim 10, wherein the memory stores further instructions to cause the at least one processor to generate the hash by hashing a pre-shared string and concatenating the hashed pre-shared string to the public bootstrapping key of the wireless device.

15. The wireless device of claim 13, wherein the instructions that cause the at least one processor to perform authentication operations comprise further instructions that cause the at least one processor to receive, from the network management entity and the AP, an authentication request message comprising a shared secret and a first nonce encrypted by a first symmetric key.

16. The wireless device of claim 15, wherein the instructions that cause the at least one processor to perform authentication operations comprise further instructions that cause the at least one processor to implement acts comprising:
    checking whether the hash is included in the authentication request message;
    in response to a determination that the hash is included in the authentication request message, generating the shared secret and deriving the first symmetric key with which to decode the first nonce;
    generating a second nonce, a second shared secret, and a second symmetric key, wrapping the first and second nonces and capability information of the wireless device in the first symmetric key, and wrapping an authenticating tag in the second symmetric key;
    placing another hash of the public bootstrapping key of the wireless device, a public protocol key, the wrapped first and second nonces, a wrapped network public key obtained during the performance of the authentication operations from the AP, and the wrapped authentication tag in an authentication response message; and
    transmitting the authentication response message to the network management entity and the AP.

17. The wireless device of claim 10, wherein the memory stores further instructions to cause the at least one processor to exchange association request and response messages with the network entity and the AP to associate the wireless device to the AP.

18. The method of claim 1, further comprising generating the hash by hashing a pre-shared string, and concatenating the hashed pre-shared string to the public bootstrapping key of the wireless device.

19. The device of claim 6, wherein the network access information is determined based on a defined provisioning policy.

20. The device of claim 19, wherein the provisioning policy comprises information regarding at least one hardware information of the wireless device, software information of the wireless device, availability of the WLAN, and loads of the WLAN.

* * * * *